United States Patent [19]

Scott et al.

[11] 3,988,540
[45] Oct. 26, 1976

[54] INTEGRATED CIRCUIT MODEM WITH A MEMORY STORAGE DEVICE FOR GENERATING A MODULATED CARRIER SIGNAL

[75] Inventors: John B. Scott, Miami Springs; Sang Y. Whang, Miami; Robert G. Ragsdale, Hollywood; Ran-Fun Chiu, Miami, all of Fla.

[73] Assignee: Milgo Electronic Corporation, Miami, Fla.

[22] Filed: Dec. 10, 1974

[21] Appl. No.: 531,296

Related U.S. Application Data

[63] Continuation of Ser. No. 250,667, May 5, 1972, abandoned.

[52] U.S. Cl. .................................. 178/67; 325/30; 325/163; 332/9 R
[51] Int. Cl.² .......................................... H04L 27/20
[58] Field of Search .............. 325/38 R, 38 A, 38 B, 325/30, 163, 141, 145, 147; 178/66–68; 328/14; 332/9.11; 179/1 SA, 15 A; 235/154

[56] References Cited
UNITED STATES PATENTS

| | | | |
|---|---|---|---|
| 3,524,023 | 8/1970 | Whang | 178/66 |
| 3,587,088 | 6/1971 | Franaszek | 325/38 A |
| 3,617,941 | 11/1971 | De Lellis, Jr. | 178/66 |
| 3,619,503 | 11/1971 | Ragsdale | 178/66 |
| 3,735,269 | 5/1973 | Jackson | 328/14 |
| 3,747,024 | 7/1973 | Choquet et al. | 325/38 B |

Primary Examiner—Robert L. Griffin
Assistant Examiner—Jin F. Ng
Attorney, Agent, or Firm—Jackson & Jones

[57] ABSTRACT

An apparatus capable of transmitting digital data at high data rates over a communication link is disclosed. A carrier signal is modulated by serial groups of digital data signals to be transmitted during a plurality of successively appearing modulation periods. The data-modulated carrier is represented by a unique group of digital signals stored in a memory. The memory upon command, reads out a predetermined sequence of digital signals with each predetermined sequence representing the signal shape of a digital data modulated carrier signal which appears as though it has been passed through a narrow band limited linear phase network. The memory stores a predetermined number of such sequences of digital signals.

The number of sequences is four in one preferred embodiment of this invention. In that preferred embodiment, each sequence occupies a spectrum frame which extends in time over four successive modulation periods. Timing at the transmitter insures that the starting time of each frame is successively offset by one modulation period relative to the start of the preceding frame. A summing circuit connected between the memory storage device and an input to the communication link adds the sequences of digital signals as they are read from the memory in a predetermined order. The summing operation generates a composite data modulated signal for application to a communication link.

19 Claims, 9 Drawing Figures

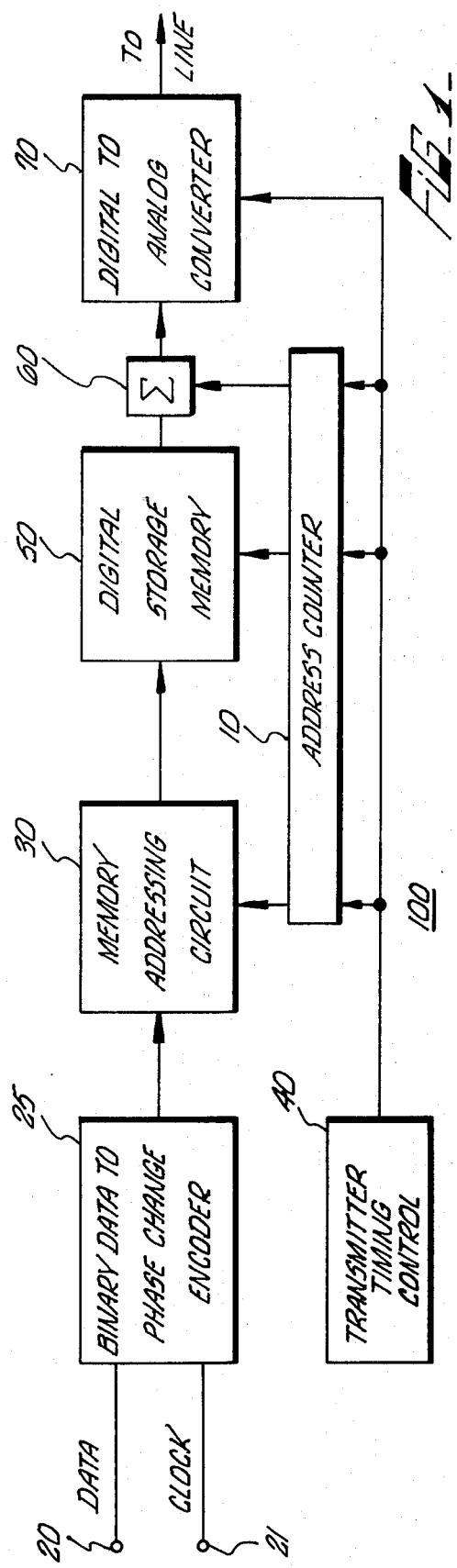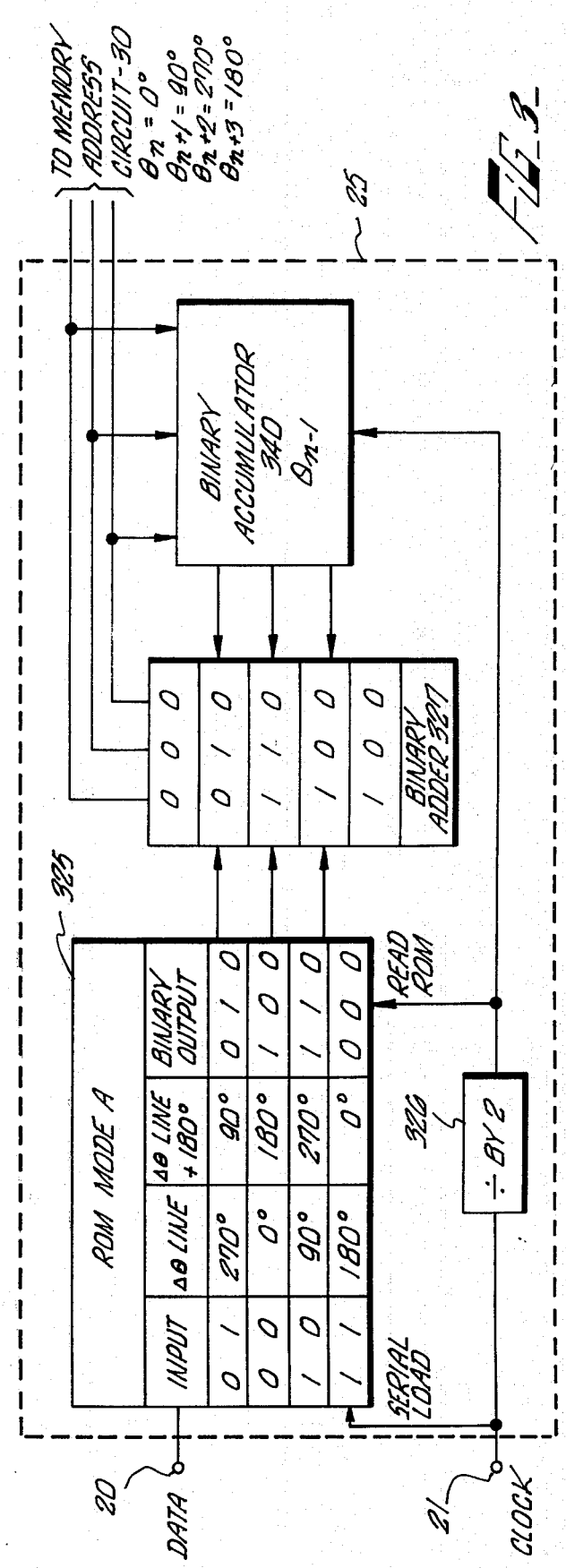

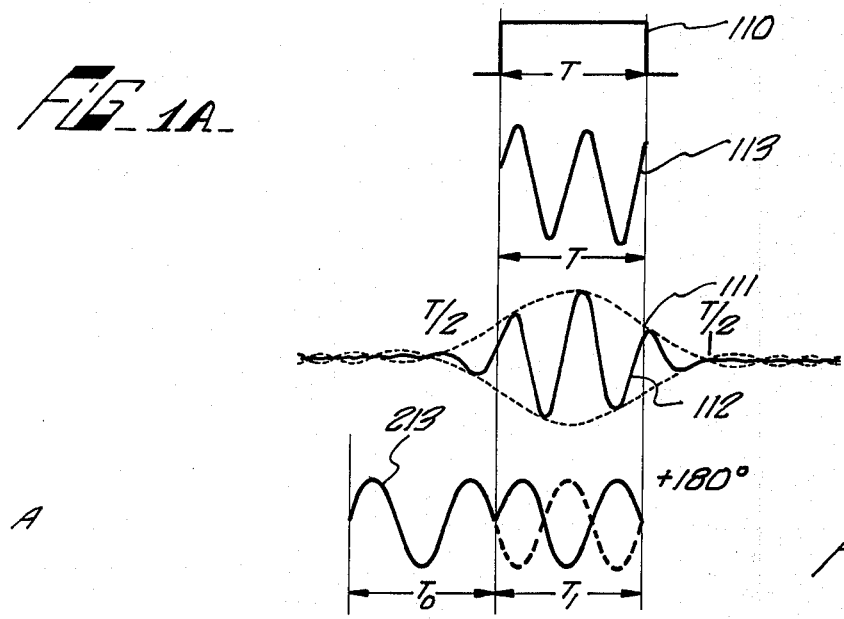
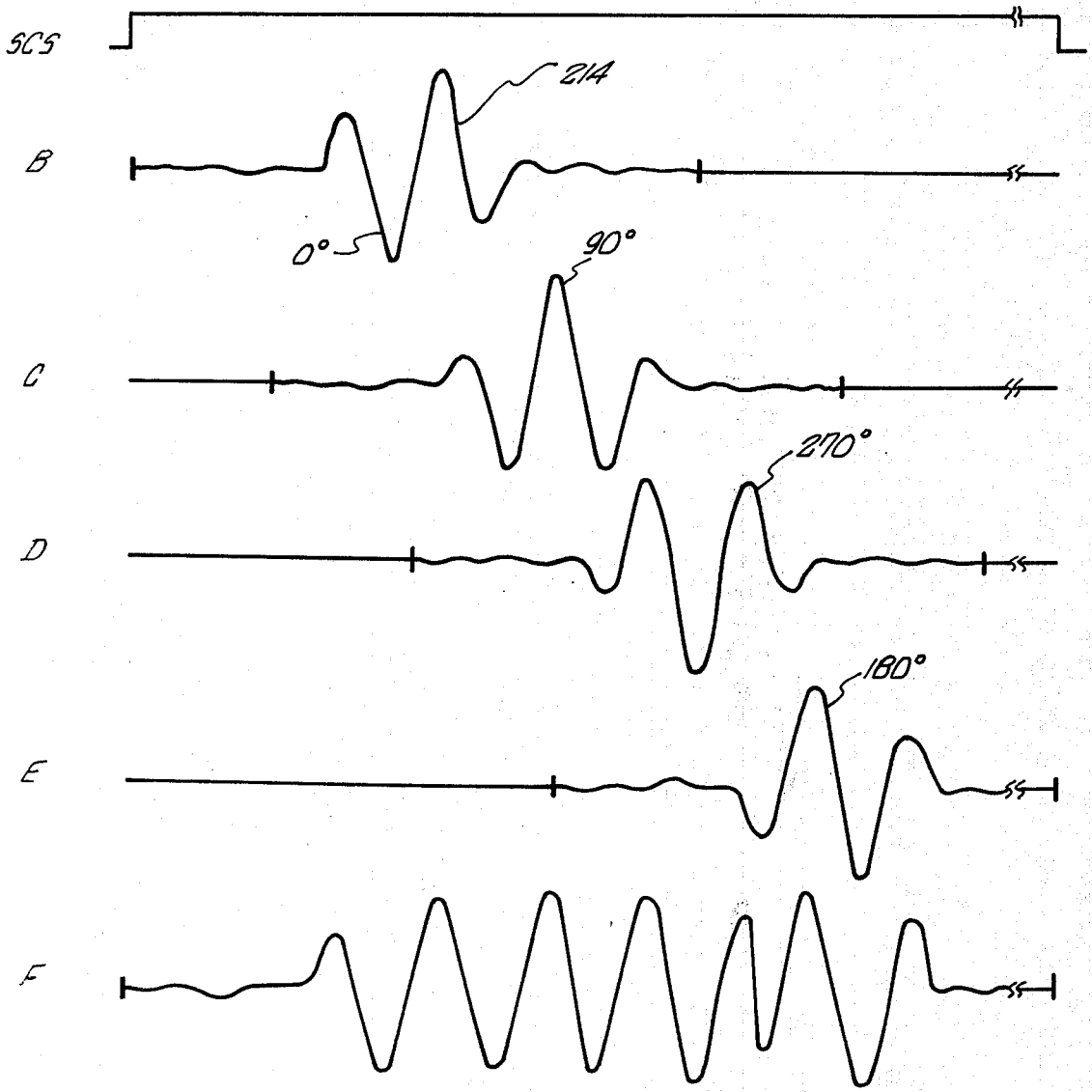

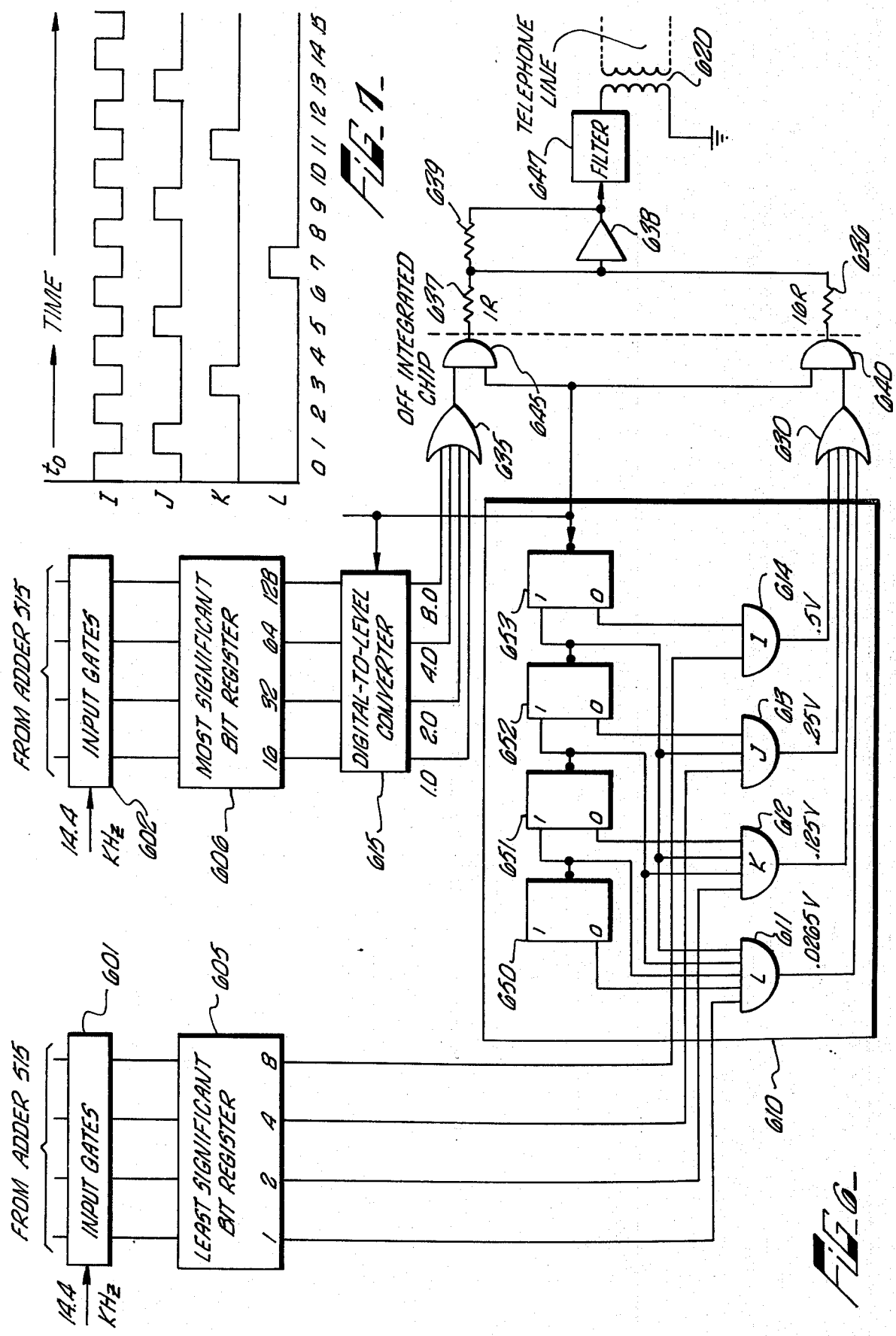

INTEGRATED CIRCUIT MODEM WITH A MEMORY STORAGE DEVICE FOR GENERATING A MODULATED CARRIER SIGNAL

This is a continuation of application Ser. No. 250,667, filed May 5, 1972, now abandoned.

BACKGROUND OF THE INVENTION

1. Field of the Invention

The field of this invention includes digital circuitry for synthesizing an analog waveform of a particular desired shape.

The primary application of this invention is in a communication system for digital data and particularly involves such communication systems as are adapted for connection to telephone lines, associated telephone circuitry and the like. More particularly, the transmitter of this invention is substantially entirely digital and, thus, is readily subject to an integrated circuit manufacturing technique.

2. Description of the Prior Art

The concept of providing a modem adaptable for integrated circuit manufacturing is a familiar desire known to the prior art. For example, such a modem is discussed in an article entitled: "The Use of Digital Circuit in Data Transmission," Philips Technical Review, Vol. 30, No. 3, Pages 71–81, 1969. In that article the stated goal was to design an all digital transmitter as an integrated circuit, wherein, digital signals are modulated onto a carrier and the signal is filtered by a digital transversal filter. As is typical in such prior art techniques broad bandwidth is employed in order to maintain signal integrity over the entire modulation period. This means that the entire frequency spectrum of the communication link, such as a telephone line, is utilized in order to transmit the digital modulated signal from one modem transmitter to one modem receiver. A great deal of bandwidth is thus wasted. In addition, the modem there described utilizes a complex and sensitive digital transversal filter. This component includes numerous weighted resistors that must have extremely precise values. Such resistors are not readily subject to an integrated circuit manufacturing technique. Furthermore, the complexity of operation of this prior art modem transmitter is a limiting factor in its feasibility and commercialization.

In U.S. Pat. No. 3,524,023, issued Aug. 11, 1970, by Sang Y. Whang, and assigned to the same assignee as the present invention, a narrow bandwidth modem utilizing a single carrier/double sideband is described and claimed. Each serial group of digital signals to be transmitted during each given modulation interval are passed through a bandpass filter which has a bandpass of 1/T Hz with its center frequency of $f_0$, the carrier frequency. The phase characteristic of the filter and its associated communication link is substantially linear within the narrow passband and a highly unusual wave shape is developed. Reference to the above-mentioned patent will supply details of operation if desired. Briefly, however, certain fundamental concepts of the above-mentioned patent will be described to enhance a clearer understanding of this invention. As discussed in the above-mentioned patent, extremely narrow bandwidth is utilized for data transmission regardless of the type of modulation utilized. As typical examples, the carrier frequency, $f_0$, may conveniently be located between 1600 and 1800 Hz for transmission of either 2400 bits per second or 4800 bits per second. Bandwidth based upon groups of three serial bits in a differential phase modulation system is about 800 Hz for 2400 bits per second or is about 1600 Hz for 4800 bits per second. The passband for the two typical examples given is, thus, approximately 1300 Hz to 2100 Hz for 2400 bits per second or 900 Hz to 2500 Hz for 4800 bits per second, with $f_0$ located at 1700 Hz.

In U.S. Pat. No. 3,128,343, issued Apr. 7, 1964, to P. A. Baker, another prior art data communication system is disclosed. In the Baker system incoming digital data is grouped into bit pairs called dibits. Two separate channels are employed in the transmitter with each channel alternately encoding successive dibits as differential phase angles in a carrier signal. A raised cosine impulse response is amplitude modulated on the carrier in each channel. The raised cosine impulse response, at one half the transmission rate, is switched from one channel to the next in the channel pair so that the differential phases in the channels do not significantly interfere with one another. The signals from both channels are applied to a telephone line. The various circuits employed in the Baker patent are analog rather than digital in nature. There is no suggestion that any particular signal spectrum be digitized as a plurality of discrete values that are stored in a memory. Mentioning such patent, as prior art with respect to applicant's invention, is simply based upon the fact that a data modulated carrier may be alternated as a pair of signals, with one signal each for one channel each for a pair of channels.

SUMMARY OF THE INVENTION

Our invention in its broadest aspect comprises a transmitter in which a carrier signal is modulated by digital data to be transmitted over a communication link, wherein the data modulated carrier is represented by a unique group of discrete signal values stored in a memory. The memory, upon command, reads out a predetermined sequence which represents the signal shape of a digital data modulated carrier. The predetermined shape appears as though it had been passed through a narrow band limited linear phase network having a passband width of 1/T Hz with a center frequency of $f_0$, where $f_0$ is the carrier frequency in cycles per second.

In one preferred embodiment of our invention, the predetermined signal shape occupies a signal spectrum which extends in time for a frame, with a frame comprising four successive modulation periods. In this particular embodiment, four successive frames are utilized to form a composite signal. Each frame's starting point in time is offset by one modulation period with respect to the preceding frame. The memory storage device of our transmitter, upon command, reads out several discrete sequences. A summing circuit is connected to the output of the memory storage device and is timed in such a manner that it collates the sequence of signals as they are read from the memory. The summing operation generates in a digital manner a composite data modulated carrier for application to a communication link.

BRIEF DESCRIPTION OF THE DRAWINGS

FIG. 1 is a block diagram of the transmitter of our invention;

FIG. 1A is an illustration of waveforms from the aforementioned prior art patent;

FIG. 2 is an illustration of waveforms useful in explaining certain of the operational concepts of the transmitter of FIG. 1;

FIG. 3 is a more detailed block diagram of a selected portion of the transmitter of FIG. 1;

FIG. 6 depicts digital to analog circuits adapted for connection to the output leads depicted in FIG. 5;

FIG. 7 is a signal chart useful in explaining the operation of the apparatus of FIG. 6.

DESCRIPTION OF THE PREFERRED EMBODIMENT

Figure 4:
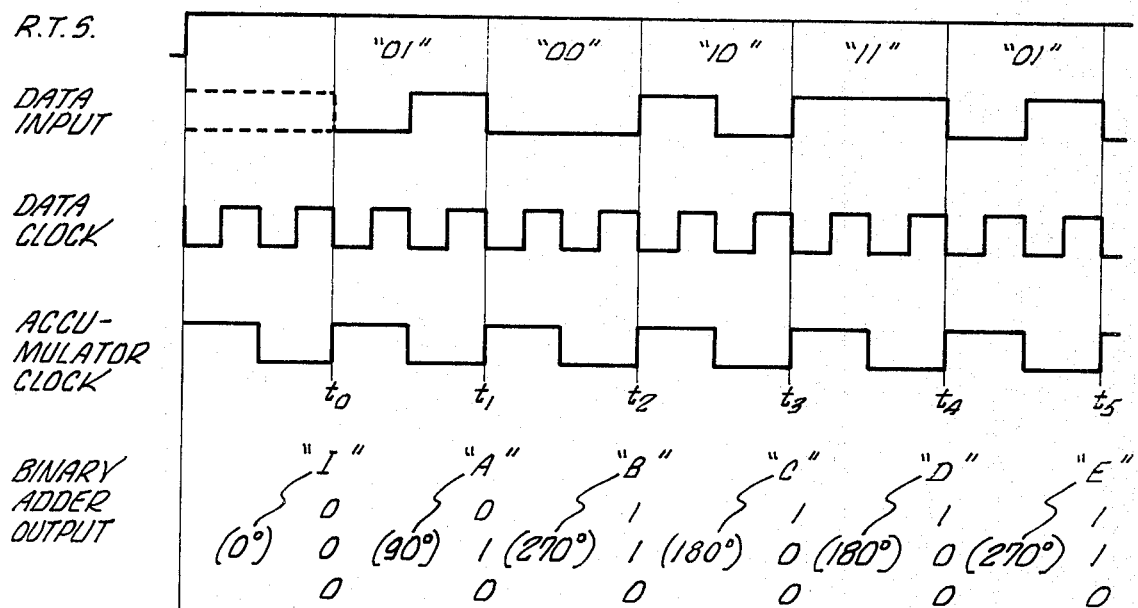
FIG. 4A is a timing chart useful in describing the operation of the circuitry of FIG. 3.
FIG. 4B depicts waveforms useful in describing the timing operation of FIG. 3.

FIG. 1 discloses a block diagram of a digital transmitter 100 in accordance with the principles of this invention. As earlier stated the ultimate goal of this invention is to provide a modem transmitter which may be readily and economically manufactured as an integraed circuit. In this regard it is believed helpful to generally summarize the operation of the transmitter 100, FIG. 1, before setting forth a more detailed description of our invention.

In its broadest concept the transmitter 100, FIG. 1, comprises an input circuit 20 for receiving serial data along with an input circuit 21 for receiving a clock signal as is normally the case in all data modem transmitters. This invention may employ frequency modulation, phase modulation, amplitude modulation, or any combination of same.

Simply for ease of description a preferred inventive embodiment employing differential phase modulation will be described in connection with the block diagram transmitter 100, FIG. 1. As is well known, in differential phase modulation phase shifts in a selected carrier are assigned from one modulation period to the next. The difference between the phase in two adjacent modulation periods, identifies the data represented in a given modulation period relative to the data represented in a previous modulation period. In the particular transmitter of this invention, a pair of memories are employed in the transmitter. Such memories may be of the read only memory type as they are particularly well suited for integrated circuit manufacturing techniques. Obivously, however, other memory types suitable for integrated circuit manufacturing techniques may also be employed.

Assume, for example, that the incoming binary data is grouped into any convenient multi-bit grouping. Each multi-bit grouping is applied to a first read only memory (hereinafter ROM) which is located in the binary data to phase change encoder 25. Encoder 25 emits timed digital outputs which are representative of differential phase amounts. These differential phases are assigned, in any selected manner, a given amount which identifies the unique bits present in the multi-bit groupings. The digital output signals from encoder 25, timed by address counter 10, constitute one portion of an address signal that is received by a memory address circuit 30. Address circuit 30 subsequently applies these digital outputs to a digital storage memory 50. Address counter 10 provides another input signal to the memory addressing circuit 30. These two signals, namely an output signal from encoder 25, and an output signal from address counter 10 are utilized by memory addressing circuit 30 to fully address digital storage memory 50.

Memory 50 is addressed in such a manner that predetermined relative phase changes in a selected carrier signal are emitted as a predetermined sequence of unique digital characters. These unique digital characters will be more fully described hereinafter with respect to FIG. 5. Briefly, however, memory 50 stores a large number of discrete unique constants in the form of encoded digital words. Upon command from memory addressing circuit 30 and address counter 10, the encoded digital words are read in a given timing sequence from memory 50. Each sequence extends over several modulation periods in order to fully define each given absolute phase amount. A summing circuit 60, also timed by the transmitter timing control 40, collates or sums the binary bits of the encoded words as they are read from memory 50. The summed signal from circuit 60 is applied to a digital to analog converter 70. The converter 70, in response to a summed signal from circuit 60, forms a composite differential phase waveform for application to a communication link. Experience has shown that the composite line signal of this invention is optimum for application over various classes of telephone lines including those poor quality telephone lines which exhibit irregular and erratic amplitude and delay characteristics.

With the general description in mind, reference is now made to FIG. 1A which depicts certain waveforms presented in the Narrow Band Limited Telephone Line Data Communication System, U.S. Pat. No. 3,524,023 assigned to the present assignee.

FIG. 1A depicts a step function input 110 for an entire modulation period T. If such an input is applied to a linear phase $1/T$ Hz bandpass filter of the narrow characteristics described in the abovementioned patent, then the filter's output is one-half of the envelope 111 shown in dashed lines. If, on the other hand, a sine wave input 113, is applied as an input signal to the narrow bandpass filter, the filter's output is a full envelope having the analog signal 112 present with diminished amplitude ringing into several adjacent modulation periods.

As described and claimed in the aforementioned patent, the narrow bandlimiting filter preserves the integrity of the transmitted phase of the input carrier signal 113, in the middle of the modulation period. Other portions of signal 112 do not maintain phase integrity and are useless for data sampling. The unique signals are readily available for derived clock timing, ease of equalization and other advantages as described in the aforementioned patent. The present invention makes use of the discoveries of the aforementioned patent and improves upon that patented invention.

FIG. 2, Line A depicts a typical carrier which may be 1800 Hz associated with a modulation period of 1/1200 seconds. Any suitable carrier frequency may be employed in this invention, and the description and claims are not to be limited by the specific examples discussed herein. As shown in FIG. 2 the carrier signal 213 has 1½ cycles present in a given modulation period T.

The principles of a preferred embodiment of our invention will be explained with reference to a signal spectrum of four sectors per frame. Our invention is not limited to four sectors only. Those skilled in the art will recognize that more than four sectors could be employed since the number of sectors is a function of the available bandwidth and the bit rate being transmitted.

Carrier 213, during modulation period $T_o$, is arbitrarily assigned an absolute phase angle corresponding to 0°. By absolute it is meant that carrier 213 alone, i.e., with several modulation periods on every side of 213 being free of any signals, is passed through the aforementioned narrow passband filter of $1/T$ Hz. In such a situation it was discovered that the filtered signal rang for several modulation periods. In our invention we forced the signal shape to ring quickly to a negible value while still maintaining phase integrity at the middle of the signal's spectrum. For example, it was discovered that four sectors, or modulation periods, was a convenient and satisfactory number for most modem transmitting speeds.

The generalized mathematical expression of the spectrum $I_{(t)}$, of a single given input signal, such as signal 213 is defined as follows:

$I_{(t)}$ = [pulse response] [amplitude] [sine$\omega t + \theta$]

Where: a. The pulse response of a step function input (such as 110, FIG. 1A) as subjected to a $1/T$ Hz narrow bandwidth filter;
  b. The amplitude is any selected amplitude and need not be fixed as will be explained later;
  c. $\omega$ is related to the carrier frequency $f_o$, which in our exemplitive case is 1800 Hz; and
  d. $\theta$ is any selected angle, which in our exemplitive case will be (2N × 45°), where $N$ is 0, 1, 2 or 3.

The analog shape of different absolute phase angle amounts (assuming a data modulated carrier 213) have different signal spectrums over their own four sectors. Thus at lines B, C, D and E of FIG. 2 signal spectrums for absolute phase angles of 0°, 90°, 270°, and 180°, respectively, are depicted. The composite waveform shown in Line "F" of FIG. 2 is ultimately presented as an output from transmitter 100 to the telephone line over which the modem transmitter is to operate.

Reference is now made to FIG. 3 wherein the encoder 25 of FIG. 1 is shown in more detail. Encoder 25 includes a first ROM 325, whih responds to the clock signal output from a divide-by-two circuit 326 to read out any preselected digital character. As a typical example, ROM 325 may operate in any one of four possible modes which will be more fully described hereinafter. The particular mode depicted for ROM 325 in FIG. 3 is mode "A." Four possible binary pair input conditions to ROM 325 are 00, 01, 10, 11. Associated with each possible input bit pair at the output of ROM 325 in mode "A" is a digital output character indicative of phase angles of 90° multiples. In mode "A" the digital characters from ROM 325 comprise three bits per character. In the exemplitive character of mode "A" the least significant bit is at the right hand side. A binary "one" in that position corresponds to a 45° angle, (in mode "A" there are none). The most significant bit is on the left hand side and a binary "one" in that position corresponds to a 180° angle. A binary "one" in the middle bit position corresponds to a 90° angle.

It is essential that the inherent 180° phase difference due to the 1½ cycles of carrier 213 be adjusted for by encoder 25. Without considering any data modulation whatsoever, carrier 213 changes phase by 180° in each adjacent modulation period. As depicted earlier at line A, FIG. 2, as previously described, carrier 213 is shown in solid line (modulation period $T_o$) and in dashed lines (modulation period $T_1$) as it would normally appear. Obviously carrier 213 is out of phase by 180° when the signal present in $T_1$ is compared with the signal present in $T_o$. If 180° is added to carrier 213 during each modulation period T, then carrier 213 in adjacent modulation periods $T_o$ and $T_1$, etc., is always in phase. Stated another way, the carrier signal present during each modulation period, without data-representing phase changes involved, will exhibit a 0° phase shift when 180° is added in each modulation period, T.

The 180° phase change is accomplished in ROM 325, FIG. 3, as shown by adding 180° for the input bit pair 00. As earlier described the output character 100 with a "one" in the left hand position adds 180° and this compensates for the inherent phase shift in carrier 213. Thus, ROM 325 for input pair 00 emits an in-phase signal, or 0° differential phase, output value of carrier 213.

The four possible binary input bit pairs described earlier are depicted, from top to bottom in the input column of ROM 325, as they might appear in time during a random string of input data. The $\Delta \theta$ or required angle change assigned to each binary bit pair combination is shown in the second column of ROM 325. This $\Delta \theta$ is the angle that is desired for ultimate application to the telephone line. In the third column of ROM 325, 180° is added to correct for the inherent phase shift of carrier 213 as described earlier. The last column of ROM 325 depicts the actual binary characters respectively read out from ROM 325.

Output characters from ROM 325 are applied to binary adder 327 which may be any conventional binary adder. It is assumed simply for a starting condition that an initial character "I" is stored in the binary adder. Thus, at starting time $t_o$, character "000" is shown in the top, or output portion, of adder 327.

This first character "I" ("000") is applied to the memory address circuit 30 by binary adder 327 in the manner depicted in FIG. 4.

Figure 4A:
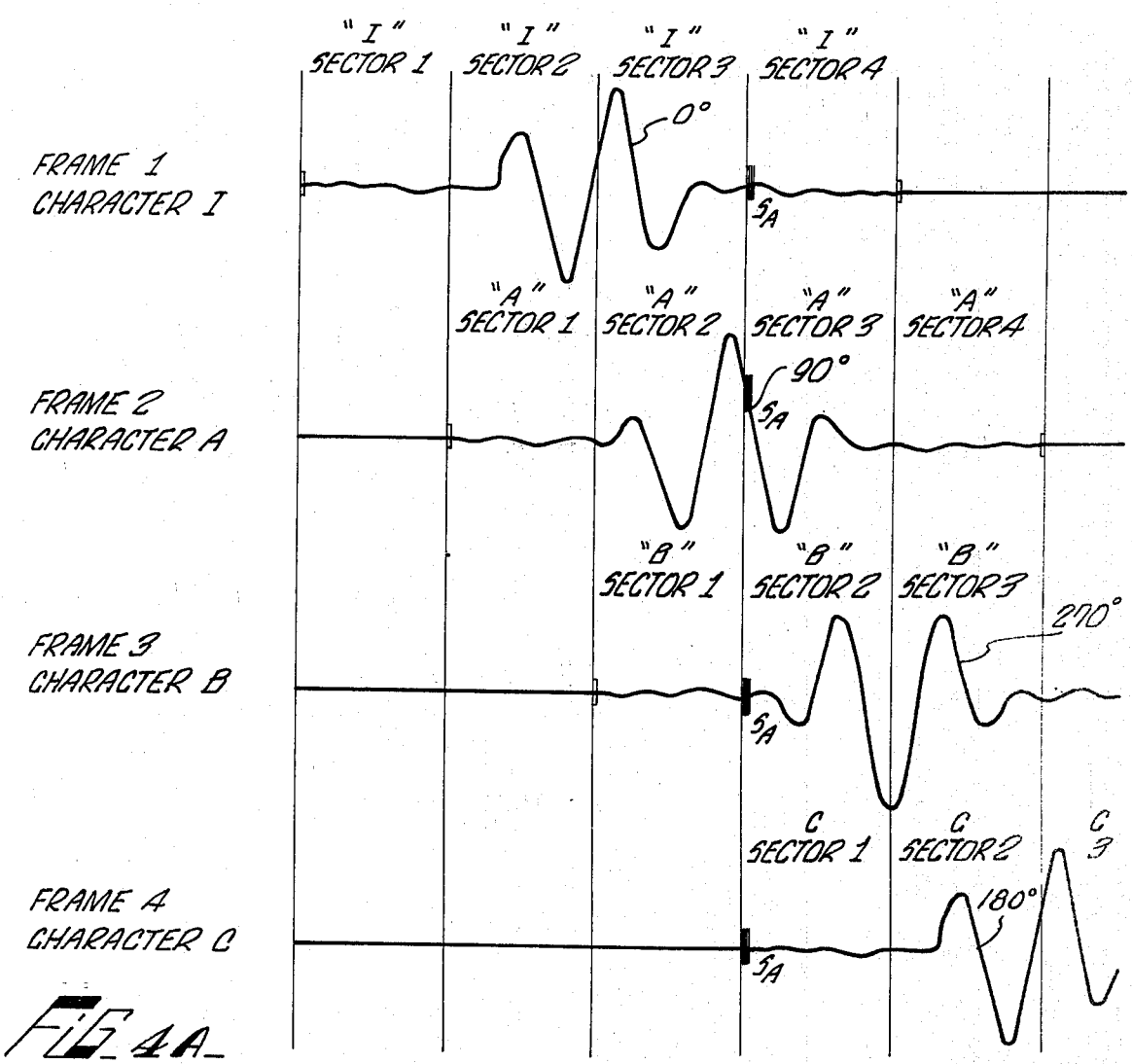

Reference to the waveform and timing diagram of FIG. 4A at row A, shows that a ready to send signal (RTS) was true or high, during this start period. The true condition and the initial character I ("000") being present in the top position of binary adder 327, FIG. 3, are proper conditions to start the transmitter operation. At time $t_o$, character "I" is applied as $\theta_n$ to memory address circuit 30. The data, at Row B of FIG. 4A, follows this arbitrarily assumed input condition. The next exemplitive bit pairs, in the order received are 01, 00, 10 and 11. These bit pairs are serially loaded into the input exchange of ROM 325 by the 2400 Hz data clock. This data clock is divided down to the baud rate of 1200 bits per second by circuit 326, FIG. 3. The output of divider 326 reads out the characters from ROM 325, which characters are representative of the change in phase plus 180°.

Adder 327 receives the characters from the output of ROM 325. Adder 327, supplies binary characters to accumulator circuit 340, which operates in response to the baud rate clock from divider 326. Adder 327 and accumulator 340 cooperate to accumulate successive characters after they are read from ROM 325 and binarily add each character, stored in binary adder 327, to a previous character, $\theta n-1$, as supplied by accumulator 340.

The binary accumulator circuit 340 may be any conventional accumulator circuit as is well known in the prior art. Its operation will now be described with reference to the initial starting condition, namely, that character I ("000") at time $t_o$ is present in the top position of adder 327. This initial character I in this case is assumed to represent a data-modulated angle of 0° in carrier 213. Output $\theta n$ at time $t_o$ FIG. 4A, is sent to memory address circuit 30. The next data bit pair "01" is thereafter input into ROM 325. At time $t_1$, FIG. 4A, an output character A ("010") is read from ROM 325 under control of the read ROM signal from divider 326. This output character A ("010") is supplied to the binary adder 327 and it is added to the previous character I, ("000"). The resultant binarily added signal total is "010.". The character "010" represents a data-modulated differential phase shift of 90° to carrier 213. The resultant "010" then assumes the top position in binary adder 326 in the manner just described. Reference to FIG. 4A shows that this character A is supplied to memory address circuit 30 as $\theta n+1$ at time $t_1$. The binary accumulator 340 repeats the operation just described when the next character B ("100") is read from ROM 325 shortly fter time $t_1$. Thereafter the operation continues in the manner described such that bit pairs 10, 11, 01, etc., are represented by characters C, D, E and the like.

It should be noted, in the operation of the transmitter 100, FIG. 3, as described thus far, that differential phase angle represented by binary encoded words are emitted to memory address circuits 30 by binary adder 327. Thus the binary words representing characters "I" "A" "B" and "C" (FIG. 4A) each differ from the preceding character encoded word by a given angle that represents the data. It should be understood, also that as described thus far provision has already been made to adjust for the fact that the original 1800 Hz carrier always includes 1½ cycles per modulation period. If some other carrier signal were selected, then a similar adjustment could be made for the expected repetitive phase difference of the selected carrier per each modulation period. For example, if a carrier of 1200 Hz were selected for a slower transmission rate, then it is obvious that no phase correction need be added because there is no phase difference from one modulation period to the next. FIG. 4B as will be more fully explained hereinafter represents the analog forms of the differential phase angles represented by the binary words from the phase change encoder 25.

Figure 5:
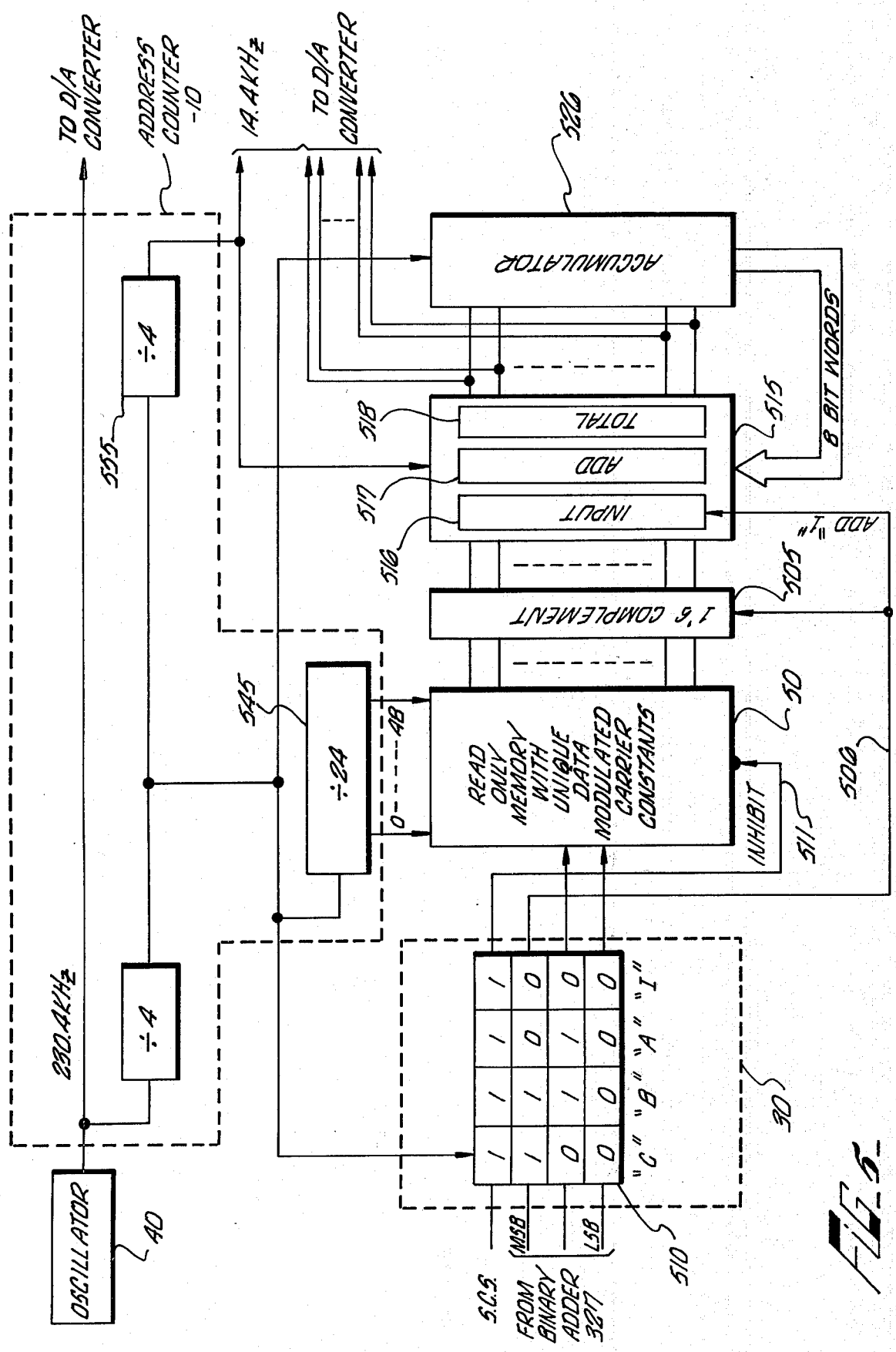
FIG. 5 is a more detailed block diagram of another selected portion of the transmitter of FIG. 1.

FIG. 5 depicts additional details of memory addressing circuit 30 and certain other block diagrams of the transmitter 100 of FIG. 1. Binary adder 327 supplies the relative phase angles (previously discussed) to memory address circuit 30 which includes a shift register 510. Shift register 510 may be any suitable shift register of a well known type suitable for integrated circuit manufacturing techniques. The particular example utilized in the exemplitive description of our invention is a four by four shift register with the least significant and most significant bits of the characters from adder 327 occupying the positions shown on the inputs to memory address circuit 30. Shift register 510 also receives from address counter 10, FIG. 1, shift pulses which are four times as fast as the counting rate for reading out constants from the data constant memory 50. This counting rate will be described in greater detail hereinafter.

The top row of shift register 510 normally contains binary zeros except when a soft carrier signal (SCS) is present. Zeros present in the top row of register 510 inhibit reading of any data from ROM 50 via an inhibit signal applied to ROM 50 by lead 511 in a manner well known for read only memories. An SCS condition on the other hand is represented by a binary "ONE" present in the top output stage of shift register 510. When the ready to send level is true, and SCS is present, it is indictive of a data constant request for ROM 50. Simultaneously, of course, the inhibit signal which prevented reading out values from ROM 50 is removed.

The soft carrier control (SCS) signal is depicted true in FIG. 2 for four different phases only that go over the the telephone line, Row F, FIG. 2, to build up gradually and decay gradually in the manner shown. It should be understood, of course, that many data bits would be transmitted before SCS goes false, and thus FIG. 2 is diagrammatic only. In any event, however, SCS signal goes true at the very beginning of the first signal sector and it persists true until the very last sector of the last signal frame that is transmitted. Because the beginning and end of the sectors commence and diminish in amplitude, low-valued constants are read from ROM 50. It is apparent that during these periods ROM 50 is alternately read and inhibited during the first sector of the first frame such that constants for the first sector of 0° phase only are provided from ROM 50. A similar sequence, of course, takes place at the termination of data transmission.

To appreciate in detail, how discrete constants are read out from ROM 50, reference is made to FIG. 4B and the four sectors in the first frame assigned to the initial character "I." The signal depicted during this first frame represents a 0° phase angle for the telephone line signal as discussed hereinbefore. Comparison of the wave form of character I with other characters shown in FIG. 4B discloses that during sector 1, only constants indicative of the amplitude for 0° phase are present. During this sector 1 for character I (hereinafter sector $I_1$) the other characters are not yet present because each character's frame is offset by one sector, or modulation period, from the start of preceding character's frame.

Any convenient number of read commands may be applied to ROM 50 during a given frame. The number of signals, N, present during a frame is strictly a function of how many samples are sufficient to reconstruct the desired analog signal via a desired number of unique digital constants in one frame. Assume that N is equal to 48 samples per frame, as a preferred number for this embodiment. Character I is a 0° waveform which is thus made of 12 unique constants in each one of its four sectors $I_1$, $I_2$, $I_3$, and $I_4$.

The 48 constants for a 0° phase angle is shown in decimal form in Table 1. Approximate values rounded off to the third decimal position are given in Table 1. It is not necessary to give the decimal value for every angle because they can readily be determined by those skilled in the art by simply

TABLE 1

| FRAME 1 | DECIMAL VALUE | ADDRESS COUNTER |
|---|---|---|
|  | 0 | N + 1 |
|  | 0.016 | N + 2 |
|  | 0.016 | N + 3 |
|  | 0 | N + 4 |
|  | 0 | N + 5 |
|  | 0.016 | N + 6 |
| SECTOR | 0.031 | N + 7 |
| $I_1$ | 0 | N + 8 |
|  | −0.063 | N + 9 |
|  | −0.109 | N + 10 |
|  | −0.078 | N + 11 |
|  | 0 | N + 12 |
|  | 0 | N + 13 |
|  | −0.125 |  |
|  | −0.188 |  |

TABLE 1-continued

| FRAME 1 | DECIMAL VALUE | ADDRESS COUNTER |
|---|---|---|
| | 0 | |
| | 0.484 | |
| SECTOR | 0.922 | |
| I₂ | 0.813 | |
| | 0 | |
| | −1.125 | |
| | −1.734 | |
| | −1.297 | |
| | 0 | N + 24 |
| | 1.300 | N + 25 |
| | 1.734 | |
| | 1.125 | |
| | 0 | |
| | −0.813 | |
| SECTOR | −0.922 | |
| I₃ | −0.484 | |
| | 0 | |
| | 0.188 | |
| | 0.125 | |
| | 0 | |
| | 0 | N + 36 |
| | .078 | N + 37 |
| | .109 | |
| | .063 | |
| | .0 | |
| | −.031 | |
| SECTOR | −.016 | |
| I₄ | 0 | |
| | 0 | |
| | −.016 | |
| | −.016 | |
| | 0 | N + 48 |
| | 0 | | measuring the amplitude value of an angle-modulated carrier passed through the 1/T Hz narrow band filter to derive similar amplitude tables for all other angles as desired.

Although the amplitude values of Table 1 are shown as decimal amounts, for ease of understanding, it is to be understood that they are actually represented in ROM 50 as binary words for each discrete decimal value. The binary words, for example, may be expressed as an 8 bit binary word. The manner in which these binary words are read out in a timing sequence will now be explained by reference to Table 2 taken in conjunction with FIG. 5 and the waveforms of FIGS. 4A and 4B.

As shown in FIG. 4A there are six binary characters addressed into shift register 510 of FIG. 5. Our preferred embodiment has been described in terms of four frames with four sectors per frame, based upon one sector offset per each succeeding frame. It is believed helpful to illustrate these various characters, frames and sectors in a timing chart in table form as shown in Table 2. Table 2 depicts in the vertical columns the various frames. In the horizontal column of Table 2, the various sectors for each frame are shown. The characters of FIG. 4A, and the associated angle amounts are depicted in Table No. 2 at the positions and times that they occupy. Thus, character I of 0° phase amount is shown in the four sectors of frame 1, together with 12 counts (N+1 through N+12, N+13 through N+24, etc.) for each sector. Character A is shown with its four sectors of frame 2 and each of the other characters of FIG. 4 are likewise shown with their associated frames and sectors 1 through 4.

The particular timing utilized in deriving all the various unique constants for the angles associated with characters I, A, B, C, of FIG. 4 will now be described in detail with reference to Table No. 1 and Table No. 2. One particular sample time, Sa, is shown in Table No. 2. The sample time, Sa, is selected in order to illustrate how the constants are (a) read from ROM 50; (b) binarily added, and (c) made available to the digital to analog converter 70.

As mentioned earlier with respect to Table No. 1, the values of the discrete constants are shown in decimal form, but are read from ROM 50 as eight bit encoded digital words. In Table 1, sample Sa corresponds to time N+37 of the address counter 10. The various words read from ROM 50 during sample time Sa are shown in the horizontal row including dashed rectangles in Table No. 2. The first word read from ROM 50 at, Sa, is in frame 1, sector 4, time N+37. It was mentioned earlier that shift register 510 is running at four times the rate at which the read only memory is gated. Thus during sample, Sa, characters I, A, B and C will successively address ROM 50 during this one sample time. The characters constitute address signals that are gated in any well known manner so as to select predetermined constants from ROM 50. Numerous known

TABLE NO. 2

| FRAMES 1 & 5 (CHARACTERS I & D) (FIGS. 4A & 4B) | | FRAMES 2 & 6 (CHARACTERS A & E) (FIGS. 4A & 4B) | | FRAMES 3 & 7 (CHARACTERS B & X) (FIGS. 4A & 4B) | | FRAMES 4 & 8 (CHARACTERS A & Y) (FIGS. 4A & 4B) | |
|---|---|---|---|---|---|---|---|
| Sector 1 | N + 1 … N + 12 | 0° | | | | | | |
| Sector 2 | N + 13 … N + 24 | 0° | Sector 1 | M + 1 … M + 12 | 90° | | | |
| Sector 3 | N + 25 … N + 36 | 0° | Sector 2 | M + 13 … M + 24 | 90° | Sector 1 | O + 1 … O + 12 | 270° |
| Sa-1 → Sa → Sector 4 | N + 37 … N + 48 | 0° | Sector 3 | M + 25 … M + 36 | 90° | Sector 2 | O + 13 … O + 24 | 270° | Sector 1 | P + 1 … P + 12 | 0° |
| Sector 1 | Q + 1 … Q + 12 | 180° | Sector 4 | M + 37 … M + 48 | 90° | Sector 3 | O + 25 … O + 36 | 270° | Sector 2 | P + 13 … P + 24 | 0° |
| Sector 2 | Q + 13 … Q + 24 | 180° | Sector 1 | R + 1 … R + 12 | 270° | Sector 4 | O + 37 … O + 48 | 270° | Sector 3 | P + 25 … P + 36 | 0° |
| Sector 3 | Q + 25 … Q + 36 | 180° | Sector 2 | R + 13 … R + 24 | 270° | Sector 1 | S + 1 … S + 12 | X° | Sector 4 | P + 37 … P + 48 | 0° |
| Sector 4 | Q + 37 … Q + 48 | 180° | Sector 3 | R + 25 … R + 36 | 270° | Sector 2 | S + 13 … 2 + 24 | X° | Sector 1 | T + 1 … T + 12 | Y° | gating arrangements are readily available for such read only memories, and thus need not be described in detail.

The 37th constant for a 01 phase is addressed by the output character I in the output stage of shift register 510, at time N+37. An eight bit binary word representing the decimal amount of 0.078 (see Table No. 1) is read from memory 50 into binary adder 515.

Binary adder 515 operates in a manner similar to that described hereinbefore with respect to binary adder 327, except that it is adding eight bit binary words rather than adding three bit characters. Accumulator 526 similarly operates in the same manner as accumulator 327, FIG. 3, except that it is feeding back into binary adder 350, eight bit words. Binary adder 515 comprises an input register 516 which receives each digital word from ROM 50 during sample time S$a$. Connected to input register 516 is an add register 517 which adds the input word to the previous word fed back from accumulator 526. The previous word which would be present in add register 517, in this instance, would be an eight bit word of binary "zeroes" because shift register 515 is cleared after sample time S$a$-1, Table 2 is completed. During sample time, S$a$, the first word delivered from ROM 50 is located in table 2 at frame 1, sector 4, time N+37. This word from ROM 50 is moved into the input register 516. Just thereafter, the digital word representing the output value of frame 2, sector 3, time M+25 is moved into input register 516. The total of these two values in binary form is added by add register 518. The added sum is accumulated by accumulator 526 and is fed back into the add register 517 to await the next digital input word. The summed value is then added to the next digital word representative of the value stored at frame 3, sector 2, time 0+13. Register 518 now binarily adds the three values, and accumulator 526 fees that new sum back to the add register 517 where it is available for another binary add operation when the last digital word during S$a$, is supplied from ROM 50 into input stage 516. The next digital word is the value at frame 4, sector 1, time P+1. Thereafter the last digital word is added to the total of the three previous constants by total register 518 of binary adder 515. At that instant a read out and clear signal is applied to binary adder 515. The accumulated total of all four constants of the particular sample just described is read out to a digital to analog converter 70.

As just described it is apparent that one unique constant from the fourth sector of Frame 1 (representative of a 0° phase) has been added to an earlier unique constant from the third Sector of Frame 2 (representative of a 90° phase) which is added together with two still earlier unique constants from the second Sector, of frame 3 and the first sector of frame 4, respectively representative of 270° phase and 180° phase. Although the values of the 90°, 270° and 180° have not been given in table form, their relative corresponding amplitudes are shown in FIG. 4B at sample time, S$a$. If one applies the rules previously set out in this specification the decimal values are respectively 1.297 for the 90° phase, 0 for the 270° phase and zero for the 180° phase. 0° phase in frame 4, sector 1, time P+1.

At this point in the specification, a further unique aspect of our invention needs to be described. If one applies the rule set forth in the specification for generating a phase shifted carrier in the manner herein described based upon 45° phase shifts, certain phases differ from other phases only in polarity with respect to a zero amplitude as a reference. Thus we discovered that the values of discrete constants of 0°, Table No. 1, is exactly the same amount as every unique constant for 180° except that 180° differs in polarity of amplitude with respect to zero. Stated another way, the values of Table No. 1, are exactly the same for 180° if one changes each positive decimal present in the table to a negative decimal value and vice versa. In a similar manner we discovered that the discrete unique constants for 45° are exactly the same as they are for 225° with the exception that the polarities are opposite. Similar relationships exist for 90° and 270° and for 135° and 315°. This discovery allows us to reduce the number of discrete constants stored in ROM 50 and further simplifies the transmitting operation and circuitry.

For example, if ROM 50 includes 48 constants for each absolute angle of 0°, 45°, 90° and 135°, then the opposite polarity of these frames of 48 constants each represent, respectively, 180°, 225°, 270° and 315°. Circuit implementation is simplified by using digital words stored in one's complement in ROM 50. A complement and add binary "one" operation whenever 180° or higher is addressed into ROM 50 inverts the polarities from ROM 50. This feature of our invention is now described with reference to FIG. 5 wherein a one's complement circuit 505, is connected between the output of ROM 50 and the input 516 of the binary adder 515. This one's complement circuit 505 is such that a +2 value is read from ROM 50 at a time, when in fact, a −2 is the value actually desired for the digital to analog converter 70. In such an instance, a one's complement and a binary one addition operation will take place via a command on lead 506, FIG. 5. The one's complement of the binary word indicating +2, namely 00000010, is 11111101. The addition of a binary "one" to the complement results in a total eight bit word of 11111110. Table No. 3 designates this word as representing a −2 value.

TABLE NO. 3

| AMPLITUDE VALUE | OUTPUT FROM ADDER 515 | | | |
|---|---|---|---|---|
| + Maximum | 0 1 1 1 1 1 1 1 | | | |
| + 2 Volts | 0 0 0 0 0 0 1 0 | → Compliment → | | 1 1 1 1 1 1 0 1 |
| + 1 Volt | 0 0 0 0 0 0 0 1 | & Add "1" → | | +1 |
| | | | | 1 1 1 1 1 1 1 0 |
| 0 Reference | 0 0 0 0 0 0 0 0 | | | |
| − 1 Volt | 0 1 1 1 1 1 1 1 | | | |
| − 2 Volts | 1 1 1 1 1 1 1 0 | ← | | |
| − Maximum | 1 0 0 0 0 0 0 0 | | | |

It is not believed necessary to describe in any further detail the timing operation of the circuitry of FIG. 5, since such circuitry is well known to those in the art. For the preferred embodiment described herein, however, certain typical timing values will be described. Accordingly, it has been found useful to employ a crystal oscillator 540 as part of the transmitter timing control 40. Oscillator 540 supplies a high frequency square wave clock signal to address counter 10. As a typical value the output signal from crystal oscillator 540 may be 230.4 KHz. A divide-by-24 circuit 545, emits the 0 through 48 frame counts, as described earlier, to partially address ROM 50. The output signal from oscillator 540 is a shift signal for register 510. Oscillator 540 is also connected to a divide-by-4 circuit 555 to obtain a read out and clear signal which is applied to binary adder circuit 515 after every sample pulse, Sa-1, Sa, Sa+1, etc., as described hereinbefore.

Reference is now made to FIG. 6 which depicts digital circuitry for readily converting the eight bit words of our exemplitive embodiment into waveforms having substantially digital equivalents of the analog shapes depicted in FIG. 2. The circuits of FIG. 6 comprise shift register stages and logic gates which are readily adapted for integrated circuit manufacturing techniques. Each eight bit binary word from adder 515 is divided into half words of four bits each. One four bit half word comprises the four least significant bits of the eight bit word, and the other four bit half word comprises the four most significant bits of the eight bit word. A 14.4 KHz clock signal from divider circuit 555, FIG. 5, stores the least significant bit binary word through input gate exchange 601 into the least significant bit register 605. Simultaneously the same 14.4 KHz clock enables input gate 602 to store the four most significant bits into the most significant bit register 606. A digital-to-level converter circuit 610 is connected to the output of the least significant bit register 605. A similar digital to level converter 615 is connected to the output of the most significant bit register 606. Only the digital level converter 610 will be described in detail since both converters operate in the same manner.

The waveforms of FIG. 7 depict various modifications to the high frequence 230.4 KHz signal as it is applied to the shift register stages 650 to 653 of converte 610. These stages continually apply pulse train inputs to the AND gates designated as 611 through 614. Each of the four AND gates are designated by the letters I, J, K and L. FIG. 7 depicts these same letters at I, J, K and L together with the output waveforms from those gates when any one or more of them are enabled by a binary one being present at an associated command lead of the least significant bit storage 605.

The operation of the digital-to-level converter 610 is fully described in a copending patent application by R. G. Ragsdale having Ser. No. 198,843 filed Nov. 15, 1971, now abandoned and assigned to the same assignee as the present invention. Reference may be made to tha application if full details are required. Briefly, however, a stepped waveform is obtained through the selection of one or more of the enable leads from the least significant bit storage 605 on AND gates 611 through 614. Enablement of one or more of these gates selects an additive combination of one or more of the waveforms I, J, K, L as shown in FIG. 7. These waveforms added together form a voltage level which varies between 0.0265 volts as associated with gate 611 to approximately one full volt if all of gates 611 through 614 are enabled simultaneously.

A d.c. output level from digital-to-level converter 615, associated with the most signifcant bit storage 606, operates in a manner similar to converter 610 except its output level increases to a possible voltage from approximately one volt to approximately 15 volts.

The output levels emitted by converters 610 and 615 are together connected to OR gates 630 and 635 respectively. The output of these OR gates are applied to AND gates 640 and 645 respectively, which gates are clocked by the high frequence clock of 230.4 KHz. The output terminals of AND gates 640 and 645 are available from the integrated circuit chip for electrical connection by any suitable means to input resistors 636 and 637 of a conventional operational amplifier 638 with feedback resistor 639.

The input resistors 636 and 637 are selected with weighted values such that any desired full scale level may be available. In our preferred embodiment that scale value may be approximately 8 volts, absolute, as shown in Table 3. Again reference may be made to FIGS. 2 through 4 of the above mentioned copending patent application by R. G. Ragsdale for a thorough description of the details in which a digitized and subsequently filtered waveform is generated by the circuitry of FIG. 6. Briefly, however, the various constants read from ROM 50 are summed and collated by the operation previously described. The collated signal yields the composited data modulated carrier as shown at line F of FIG. 2, except that it is a stepped digitized waveform. Filter 647 is connected between the output of amplifier 658 and the input circuitry 620 of a conventional communication link to smooth the amplifier's output to a smooth analog shape substantially as shown at line F in FIG. 2. Filter 647 also removes high frequency components introduced into the signal by the digital process employed for generating the line signal.

It was discussed hereinbefore that the binary data to phase change encoder 25, FIG. 3 was operating in mode "A." Table 4 below depicts additional modes B, C and D. Mode "B" is similar to mode "A" in that it also is a four phase mode with 90° phase differentials assigned to unique input pairs as shown in the table.

TABLE NO. 4

| INPUT | OUTPUT | | | |
|---|---|---|---|---|
| | MOD A | MOD B | MOD C | MOD D |
| 00 | 101 | 100 | 011 | 010 |
| 01 | 011 | 010 | 101 | 000 |
| 10 | 111 | 110 | 001 | 100 |
| 11 | 001 | 000 | 111 | 110 |

This mode is often referred to as the International Standard which is defined by the formula 2N+45° where N is 0, 1, 2 or 3. Mode "C" is referred to as a metrological format and mode "D" is a particularly unique format utilized in some specialized areas. Irregardless of which mode is employed, the principles for ROM 325, FIG. 3, as described earlier apply with equal force. Any of these various modes are clearly within the scope of this invention and need not be described further.

It is apparent that these modes require, in some instances different combinations of 45° angle increments. Accordingly, as a minimum, ROM 50 must store a group of unique constants for 45° and for various multiples of 45° as well. In a 16-phase modem of course the lowest multiple stored in unique constant form would be 22.5° and various multiples thereof.

As mentioned in the introduction, various forms of modulation may be employed. For example, the basic waveform of Line F, FIG. 2, in slightly different form may represent a composite signal of an eight-phase modem. Such a modem has three data bits grouped together as inputs to the binary data to phase change encoder 25. There are eight possible input groupings for three binary bits in an eight phase system, and the principle of this invention still apply by employing differential phases of 45° per each distinct three bit grouping.

It is also within the scope of this invention to utilize a four phase, two amplitude transmitting technique. A typical and simplified way of implementing a four phase, two amplitude encoding operation is to employ two read only memories storing unique data modulated carrier constants. One read only memory such as memory 50, FIG. 5 includes constants for four phases at a full amplitude. The second read only memory, similar to ROM 50 includes a similar group of constants for the exact same four phases but at a lesser amplitude. Again, the incoming binary data is grouped into three binary bit groupings for each modulation period. Two of the input bits select a phase and the third bit of the three bit groupings selects one of the two possible amplitudes for that phase from one of the two ROMS. These various data transmitting techniques are generally defined in the claims hereinafter simply as multi-level carrier modulation.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the invention may be made.

What is claimed is:

1. In a continuous carrier communication system wherein a carrier signal is phase-modulated according to binary data, apparatus for generating said phase modulated carrier signal, comprising:

memory means for storing in each of M addressable locations (M being an integer), N words, said words being divided into P sectors (both N and P being integers), the N words in each of said M addressable locations being an encoded representation of a unique phase modulated carrier signal that has been passed through a linear phase narrow bandwidth filter having a passband width defined as $1/T$ Hz with a center frequency of $f_o$, where $T$ is the modulation period and $f_o$ is the carrier signal frequency, each of said P sectors being an encoded representation of one modulation period T;

means responsive to said binary data, for addressing the M locations in said storing means according to a sequence determined by the binary data;

means for reading from said memory means, each time one of said M addressable locations is addressed, one of said N words from its respective sector P;

each sector of said P sectors in their respective M locations in memory being read out so as to be offset from the sector in another of said M addressable locations by one sector; and means for adding the N words read from their respective sectors during one addressing sequence for the M locations in said storing means, thereby generating a phase modulated, filtered carrier signal.

2. The apparatus in accordance with claim 1 wherein: said phase modulated carrier signal has a signal spectrum $I(t)$ extending over a plurality of modulation periods, said spectrum defined by the formula of;

$I(t) = $ [pulse response] $\times$ [amplitude] $\times$ [sin $(\omega t + \theta)$]
where:
a. "pulse response" is a step function input of one modulation period duration,
b. "amplitude" is any preselected value,
c. $\omega$ is related to the carrier frequency, $f_o$, and
d. $\theta$ is any selected predetermined angle at least partially identifying a unique bit arrangement in a given multi-bit grouping.

3. The apparatus of claim 1 wherein the relationship between the addressable locations M, the words N in each addressable location, and the sectors P in each addressable location is $N/P = M$.

4. The apparatus of claim 3 wherein $M = 4$, $N = 48$, and $P = 12$.

5. The apparatus of claim 1 wherein said modulation period T is equal to 1½ cycles of the carrier signal frequency $f_o$.

6. The apparatus of claim 5 further comprising means for compensating for the 180° phase shift inherent in the carrier signal because of the 1½ cycle modulation period T.

7. The apparatus in accordance with claim 1 and further comprising:
means for grouping data into equal multi-bit groups; and
encoding means connected to said grouping means and responsive to said multi-bit groups for emitting address characters to said addressing means, said characters determining a sequence indicative of the unique identity of the binary bits of the group encoded by said encoding means.

8. The apparatus in accordance with claim 7 wherein: each said multi-bit data group is represented by at least a phase difference in said carrier signal from one modulation period to a successive adjacent modulation period 9. The apparatus in accordance with claim 8 wherein: said difference in phase is assigned predetermined equal angle amounts to represent each unique binary bit possibility in said multi-bit groups and further comprising;
means associated with said encoding means for emitting a character in each successive modulation period which is indicative of said unique bits represented therein by said predetermined phase difference amount from one modulation period to the next.

10. The apparatus in accordance with claim 9 wherein said encoding means, comprises:
a read only memory for emitting said address characters as multi-bit binary characters uniquely associated with the bit possibilities in said multi-bit groups, and;
said means for emitting a character comprises;
a binary adder connected to said read only memory; and
a binary accumulator connected to said binary adder to accumulate and feed back thereto each preceding address character as a new character is read from said read only memory to said binary adder.

11. The apparatus in accordance with claim 9 wherein:
the phase angle amounts stored in said memory storage as a plurality of sequences of unique binary bits represent are multiples of 45° phase angles; and said apparatus is further characterized in that the binary bits having the same value but opposite polarities to represent said phase angle are;
a. 45° and 225°
b. 90° and 270°, and
c. 135° and 315°.

12. The apparatus in accordance with claim 11 wherein:
said binary bits are in the form of multi-bit digital words in a binary one's complement to exhibit different polarities of the signal represented thereby with respect to a selected reference value.

13. The apparatus in accordance with claim 7 wherein:
said phase modulated carrier signal has a signal specturm $I(t)$ extending over a plurality of modulation periods, said spectrum defined by the formula of;
$I(t)$ = [pulse response] × [amplitude] × [sin ($\omega t + \theta$)] where:
a. "pulse response" is a step function input of one modulation period duration,
b. "amplitude" is any preselected value,
c. $\omega$ is related to the carrier frequency, $f_o$, and
d. $\theta$ is any selected predetermined angle at least partially identifying a unique bit arrangement in a given multi-bit grouping.

14. The apparatus in accordance with claim 13 wherein:
the plurality of successive modulation periods occupied by each signal spectrum is a frame consisting of at least four modulation periods per frame; and
further comprising timing control means for offsetting in time each frame of four successive frames by one modulation period relative to a preceding frame.

15. The apparatus in accordance with claim 14 wherein:
each signal spectrum during a frame has a particularly unique shape that represents the predetermined level modulated on said carrier and identifying the unique bits of said equal multi-bit grouping.

16. The apparatus in accordance with claim 15 wherein:
the number of levels is four;
said multi-bit grouping means group serial incoming data into pairs of binary bits per group; and
each signal spectrum frame associated with one of the four binary possibilities represents a predetermined absolute phase amount that is a multiple of a 90° phase angle.

17. The apparatus in accordance with claim 16 wherein:
each one of said signal spectrums has an amplitude shape which includes low-valued constants in the first and last modulation periods of each frame as compared with relatively high-values constants in the other modulation periods of said frame; and
further comprising means reading said low-valued constants from said memory at the beginning and end of every data transmission sequence for avoiding abrupt signal changes on said communication link.

18. The apparatus in accordance with claim 17 wherein said constant reading means comprises:
means for reading said low-valued constants from said storage means during a first modulation period of a first frame; and
means inhibiting reading of any constants from said memory storage during the offset modulation periods of the other frames of said plurality of frames;
said apparatus further characterized in that said alternate reading and inhibiting means are operative only during the initiation of a data transmission sequence.

19. The apparatus in accordance with claim 17 and further comprising:
means operative during the termination of a data transmission sequence for alternately reading and inhibiting reading of constants from said storage means as said offset frames appear in time after the last modulation period terminates for the first frame which completes its last signal spectrum of the data transmission sequence.

* * * * *